(12) United States Patent  
Honda

(10) Patent No.: US 7,920,211 B2  
(45) Date of Patent: Apr. 5, 2011

(54) CROSS-COLOR/DOT INTERFERENCE REDUCTION CIRCUIT, IMAGING APPARATUS HAVING CROSS-COLOR/DOT INTERFERENCE FUNCTION, AND CROSS-COLOR/DOT INTERFERENCE REDUCTION METHOD

(75) Inventor: Yuichi Honda, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/611,836

(22) Filed: Nov. 3, 2009

(65) Prior Publication Data

US 2010/0220238 A1 Sep. 2, 2010

(30) Foreign Application Priority Data

Feb. 27, 2009 (JP) .................................. 2009-046869

(51) Int. Cl.
*H04N 9/64* (2006.01)
*H04N 9/77* (2006.01)

(52) U.S. Cl. ......... 348/609; 348/624; 348/666; 348/701

(58) Field of Classification Search .................. 348/609, 348/607, 624, 621, 665–666, 700–701, 713, 348/699, 451–452; 382/167; *H04N 9/64, H04N 9/77*
See application file for complete search history.

(56) References Cited

U.S. PATENT DOCUMENTS

| 5,305,120 A * | 4/1994 | Faroudja ..................... 348/624 |
| 6,995,804 B2 * | 2/2006 | Kwon et al. .................. 348/663 |
| 7,280,159 B2 * | 10/2007 | Chao ........................... 348/609 |
| 7,697,075 B2 * | 4/2010 | Zhu ............................. 348/609 |
| 2006/0274204 A1 * | 12/2006 | Kimura et al. ............... 348/558 |
| 2007/0067809 A1 | 3/2007 | Kwon et al. |
| 2007/0067888 A1 | 3/2007 | Manier |

FOREIGN PATENT DOCUMENTS

| JP | H08-163583 | 6/1996 |
| JP | H08-331587 | 12/1996 |
| JP | 2005-328413 | 11/2005 |
| JP | 2007-67809 | 3/2007 |
| JP | 2007-158991 | 6/2007 |
| JP | 4071788 | 4/2008 |
| JP | 2008-109218 | 5/2008 |
| JP | 4118906 | 7/2008 |

* cited by examiner

*Primary Examiner* — Trang U Tran

(74) *Attorney, Agent, or Firm* — Blakely, Sokoloff, Taylor & Zafman LLP

(57) ABSTRACT

A cross-color/dot interference reduction circuit according to one embodiment of the present invention includes a signal generation unit configured to calculate a difference in an input signal between adjacent frames and generate a difference signal, a component extraction unit configured to extract a cross-color/dot interference component from the difference signal, a combination output unit configured to combine an interference reduction signal corresponding to the cross-color/dot interference-component with the input signal and provide an output signal with a reduced cross-color/dot interference, an image scene analysis unit configured to analyze an image scene contained in the input signal, and a signal amplification/attenuation unit configured to amplify/attenuate the interference reduction signal based on an image scene analysis result from the image scene analysis unit.

8 Claims, 7 Drawing Sheets

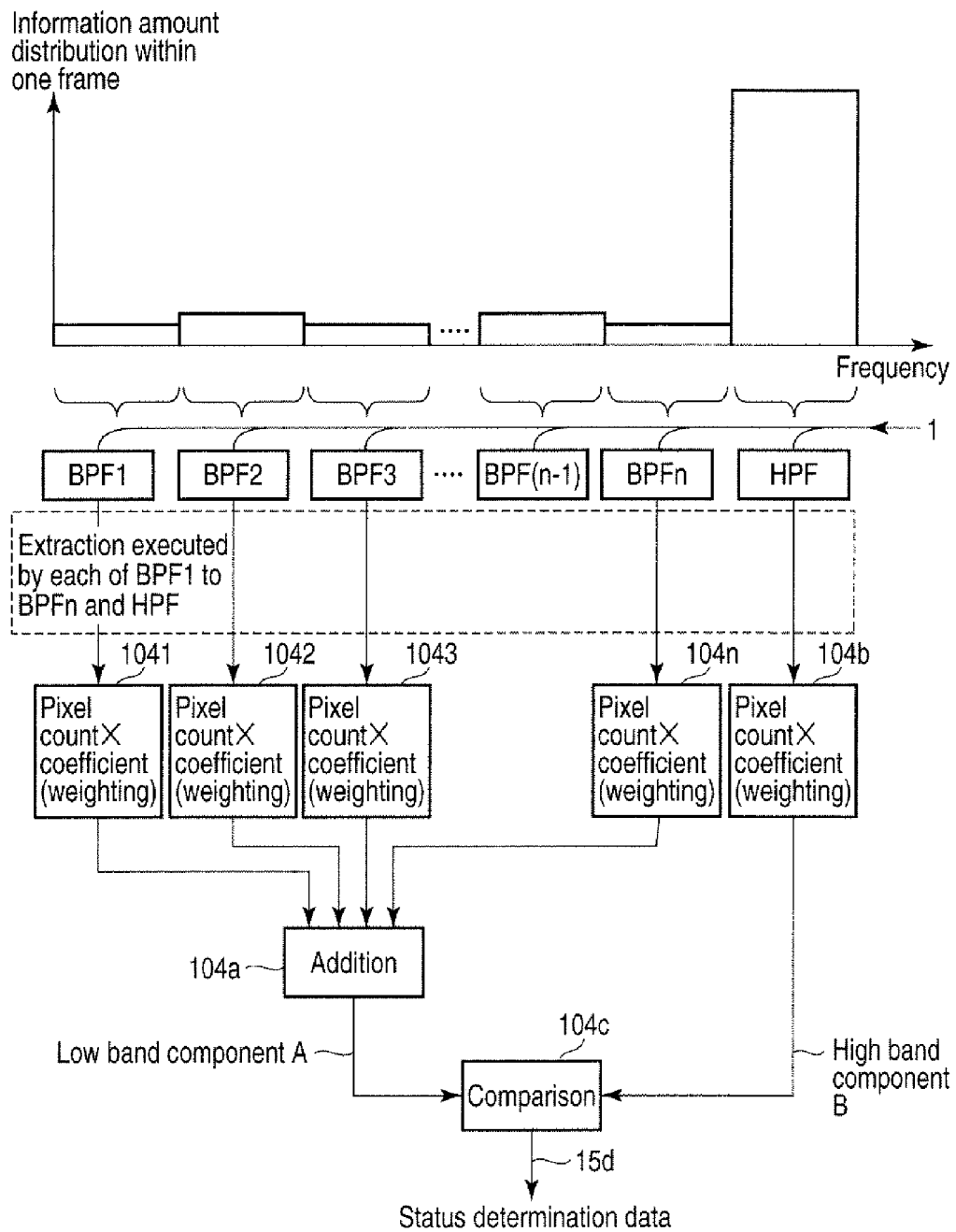
F I G. 10

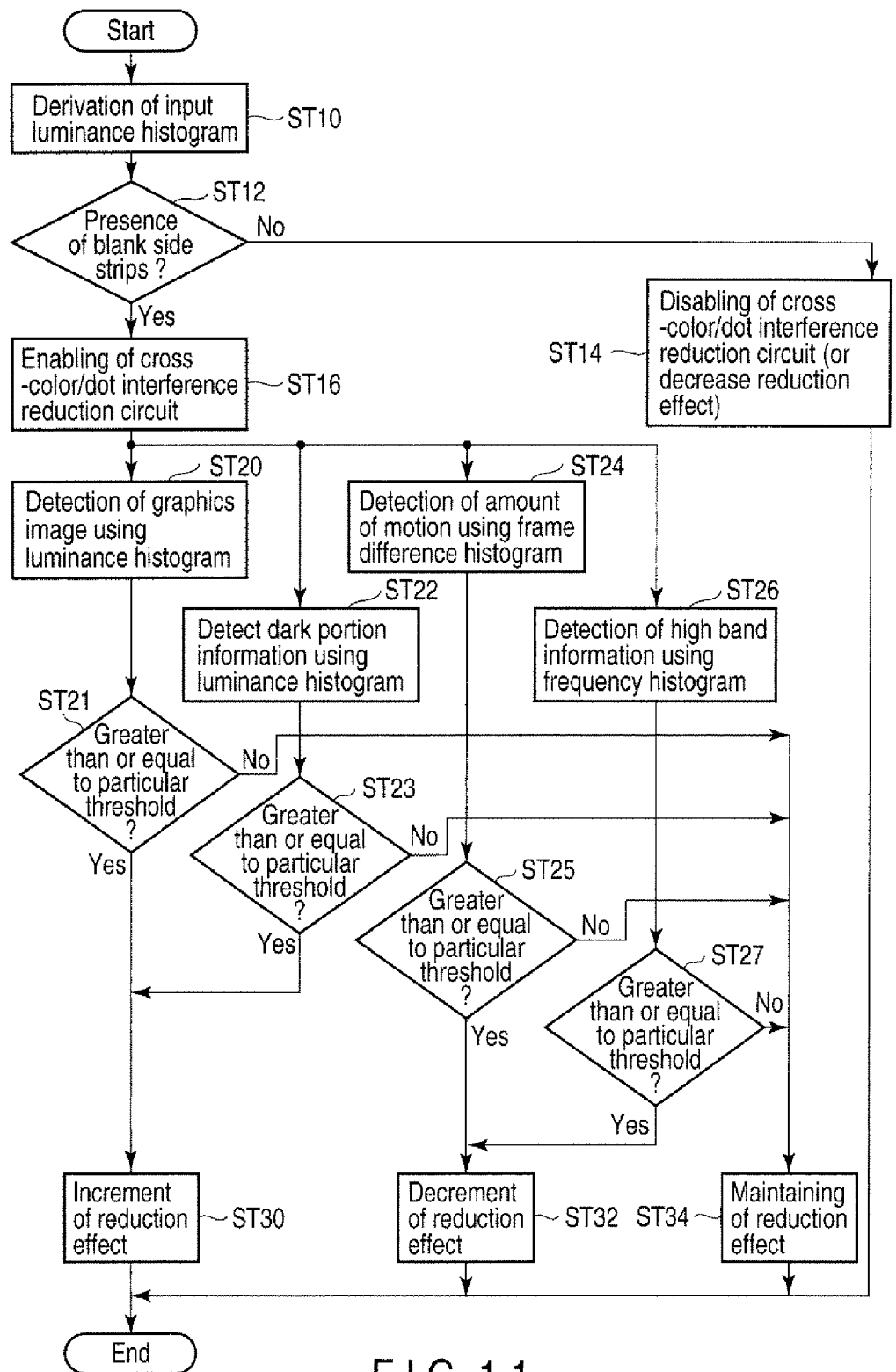
F I G. 11

US 7,920,211 B2

CROSS-COLOR/DOT INTERFERENCE REDUCTION CIRCUIT, IMAGING APPARATUS HAVING CROSS-COLOR/DOT INTERFERENCE FUNCTION, AND CROSS-COLOR/DOT INTERFERENCE REDUCTION METHOD

CROSS-REFERENCE TO RELATED APPLICATIONS

This application is based upon and claims the benefit of priority from Japanese Patent Application No. 2009-046869, filed Feb. 27, 2009, the entire contents of which are incorporated herein by reference.

BACKGROUND

1. Field

One embodiment of the present invention relates to a technique to reduce cross-color/dot interference in a color video picture.

2. Description of the Related Art

In separating a luminance signal (Y) and a chrominance signal (C) from a color television signal, cross-color interference may be caused by leakage of the luminance signal into the chrominance signal and dot interference may be caused by leakage of the chrominance signal into the luminance signal. An apparatus and a method for reducing cross-color/dot interference have been proposed (see Jpn. Pat. Appln. KOKAI Publication No. 2007-67809).

Generally, a circuit to reduce cross-color/dot interference reduces the cross-color/dot interference by taking advantage of the fact that cross-color/dot interference components in consecutive frames have opposite phases with each other and by extracting a cross-color/dot interference component using a filter and averaging extracted cross-color/dot interference components across frames. This is why, in a scene in which a large motion occurs (there is a significant change in images between frames), defects, such as impression of blurring or impression of a residual image, are apt to be generated when an averaging process is performed across the frames. Consequently, in the past, performing a cross-color/dot interference reduction on an image scene in which few motions occur has been a basic operation.

In a conventional cross-color/dot interference reduction circuit, a reduction effect of the cross-color/dot interference has mainly been controlled based on an amount of motion between image frames. However, it is difficult to completely distinguish a moving picture from a difference in cross-color/dot interference components, and this leads to an incompatibility of reducing a cross-color/dot interference and suppressing defects, such as impression of blurring or impression of a residual image. In other words, this causes a trade-off in which the defects, such as the impression of the blurring or the residual image, are more apt to occur depending on an image as the reduction effect of the cross-color/dot interference is more improved, and the cross-color/dot interference becomes more remarkable as the defects, such as the impression of the blurring or the residual image, are more suppressed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 10 is a diagram illustrating a fourth example of a structure of an image scene detection portion based on a histogram; and FIG. 11 is a flowchart illustrating one example of a control operation by a cross-color/dot interference reduction circuit.

DETAILED DESCRIPTION

Figure 1:
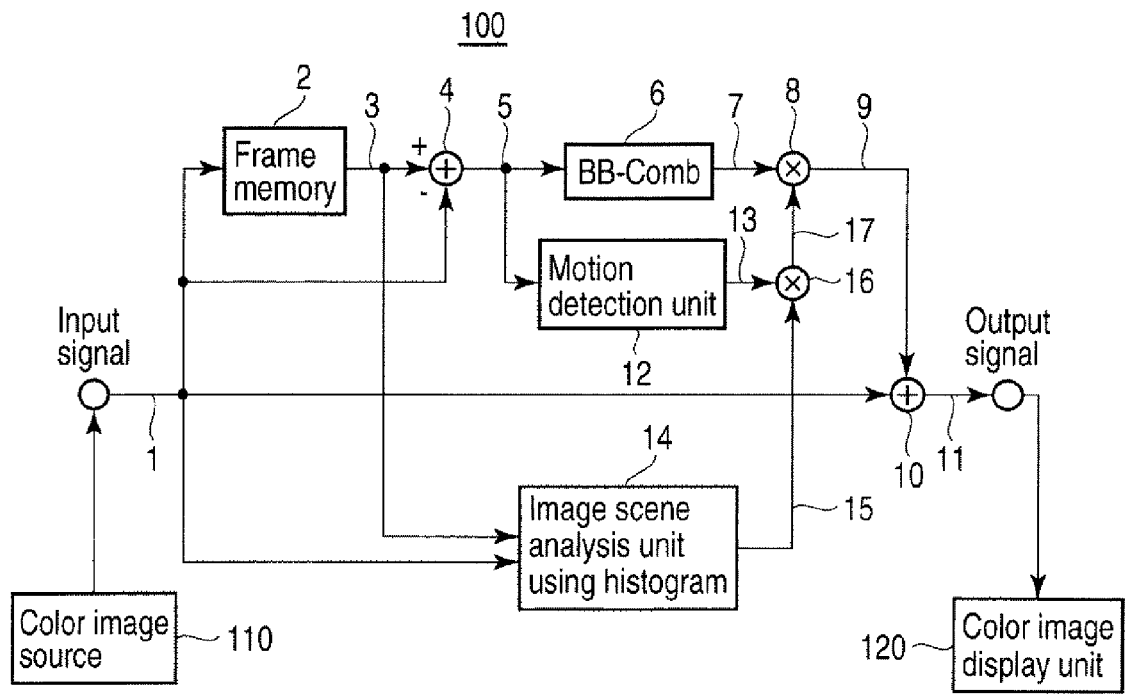
FIG. 1 is a block diagram illustrating a cross-color/dot interference reduction circuit according to one embodiment of the present invention.

Various embodiments according to the invention will be described hereinafter. In general, according to one embodiment of the invention, there is provided a cross-color/dot interference reduction circuit which reduces cross-color interference caused by leakage of a luminance signal component into a chrominance signal of a color television signal and dot interference caused by leakage of a chrominance signal component into a luminance signal, comprising a signal generation unit 4 configured to calculate a difference in an input signal including the luminance signal and the chrominance signal between adjacent frames to generate a difference signal, a component extraction unit 6 configured to extract a cross-color/dot interference component 7 from the difference signal, a combination output unit 10 configured to combine an interference reduction signal 7 corresponding to the cross-color/dot interference component with the input signal to provide an output signal with the reduced cross-color/dot interference, an image scene analysis unit 14 configured to analyze an image scene contained in the input signal, and a signal amplification/attenuation unit 16 configured to amplify/attenuate the interference reduction signal 7 based on an image scene analysis result from the image scene analysis unit 14, wherein the output having an increasing/decreasing reduction effect of the cross-color/dot interference depending on a content of the image scene is output from the combination output unit 10.

In this circuit, the output signal 11 having the increasing/decreasing reduction effect of the cross-color/dot interference depending on the content 15 of the image scene is output from an image output unit 10.

According to an embodiment of the present invention, the reduction effect of the cross-color/dot interference will be increased or decreased depending on the content (such as presence of a blank side strip or presence of a motion) of the image scene. As a result, according to this embodiment, for a moving image, for example, defects such as impression of blurring or impression of a residual image can be suppressed by decreasing the reduction effect of the cross-color/dot interference, whereas, for an image such as a commercial image having blank side strips, a computer graphics image, or an image with a large dark area, the cross-color/dot interference can be indistinct by increasing the reduction effect of the cross-color/dot interference.

Referring to the drawings, various embodiments of the present invention will be described. FIG. 1 is a block diagram illustrating a cross-color/dot interference reduction circuit according to one embodiment of the present invention. A cross-color/dot interference reduction circuit 100 is a circuit which reduces cross-color interference caused by leakage of a luminance signal component into a chrominance signal of a color television signal and reduces dot interference caused by leakage of a chrominance signal component into a luminance signal. Although this circuit 100 is configured such that a luminance signal is used as input and output signals (1, 11), this circuit may also be configured such that a chrominance signal or color difference signal (Cb/Pb, Cr/Pr) is used as the input and output signals (1, 11). In addition, the input signal 1 includes, in addition to a high-definition (HD) signal, an HD signal which is an up-converted version of a standard-definition (SD) signal (although it has an HD signal format, it has a standard definition level resolution).

That is to say, the input signal (digital signal) 1 corresponding to the luminance signal or chrominance signal (color difference signal) from a color image source 110 is stored in a frame memory 2. After one frame interval has passed, an inverted version of a signal 1 for a succeeding one frame is added, by an adder 4, to a signal 3 which has been read from the frame memory 2 for each frame. In other words, the adder 4 calculates a difference between a delayed signal 3 delayed by one frame period and a current input signal 1. Adjacent cross-color/dot interference components are inverted in terms of a phase. When two cross-color/dot interference components having opposite phases are subject to an inverting addition, the cross-color/dot interference components would be increased and signal components having non-inverted phases would be cancelled and decreased. Consequently, a signal which has been subject to the inverting addition and output from the adder 4 may be equivalent to a signal 5 which includes mainly the cross-color/dot interference component.

The signal 5 may be input to a comb filter 6. The comb filter 6 is a bandpass filter which extracts a cross-color/dot interference component (3.58 MHz) from the signal 5. The comb filter 6 provides the cross-color/dot interference component 7 from which components other than the cross-color/dot interference component are removed.

The signal 5 may be also input to a motion detection unit 12 in which motion within one frame can be detected. A motion detection result 13 corresponding to a degree of detected motion is appropriately modified by a coefficient multiplier 16 and a modified motion detection result 17 is input to a coefficient multiplier 8. An amount of modification by the coefficient multiplier 16 is determined by a later-described analysis result 16 of an image scene.

The coefficient multiplier 8 also receives the cross-color/dot interference component 7 and appropriately modifies its amplitude with the motion detection result 17. An interference reduction signal 9 corresponding to the modified cross-color/dot interference component is input to an adder 10.

The adder 10 receives an input signal 1 following the signal 3, which has been used for acquiring the interference reduction signal 9, by one frame, i.e., a current input signal 1. Cross-color/dot interference components included in the input signal 1 are averaged by the interference reduction signal 9 (cross-color/dot interference component 7) and a signal 11 with cross-color/dot interference reduced is output from the adder 10. The degree of reduction effect of the cross-color/dot interference may vary depending on a multiplication coefficient in the coefficient multiplier 8 (corresponding to a motion detection result 17). This multiplication coefficient 17 may also vary depending on an analysis result 15 of an image scene in the signal 1.

The signal 1 and the signal 3 (a signal preceding the signal 1 by one frame) read from the frame memory 2 are input to an image scene analysis unit 14 based on a histogram. The histogram refers to a frequency distribution diagram. The image scene analysis unit 14 derives (creates) a histogram of luminance levels (amplitude levels in case of a chrominance signal) and/or a histogram of frequencies from the provided signal 1 and/or signal 3 frame by frame, and analyzes a content of an image scene from the derived histogram (detail of analysis will be described later). Based on an analysis result (such as presence of a blank side strip) 15, the multiplication coefficient 17 may be changed and the reduction effect of the cross-color/dot interference may be changed.

In this manner, the reduction effect of the cross-color/dot interference is increased or decreased depending on the content of the image scene and a modified luminance signal 11 is output from the adder 10 (corresponding to an image output unit) to a color image display unit 120.

For example, a commercial image inserted into a high-definition (HD) digital broadcast has black side strips and an image portion has a definition in which a standard-definition (SD) image is up-converted and suffers from many cross-color/dot interferences. In addition, for a graphics image, such as computer graphics (CG) animation, since a color edge changes rapidly, dot interference may tend to occur. Conversely, for a scene having a large dark area, random noise may often occur. Furthermore, for an image having much high-band information such as a fine lattice pattern, or when an image contains a large flesh color area, defects of a double image may tend to occur.

In order to deal with the above-mentioned situations, in a circuit example shown in FIG. 1, there is provided an image scene analysis unit 14 in addition to a normal motion detection unit 12. This allows a reduction effect of the cross-color/dot interference adapted to an image scene to be achieved.

Figure 2:
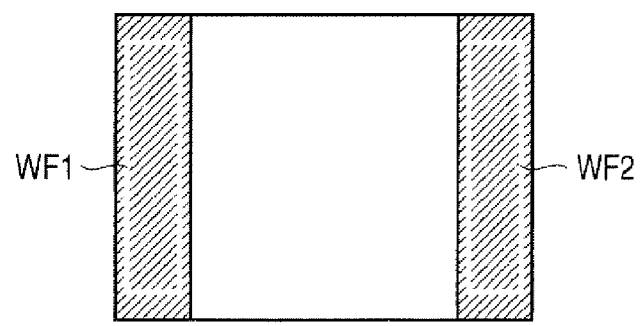
FIG. 2 is a diagram illustrating blank side strips contained in an image signal.

FIG. 2 is a diagram illustrating blank side strips included in an image signal. In this case, an example is illustrated in which a standard-definition (SD) screen having an aspect ratio of 4:3 is displayed within a high-definition (HD) display area having an aspect ration of 16:9. In this case, black side strips appear on both sides of the SD screen. White frames WF1 and WF2 of left and right blank side strips, respectively, indicate detection windows for the blank side strips.

Figure 3:
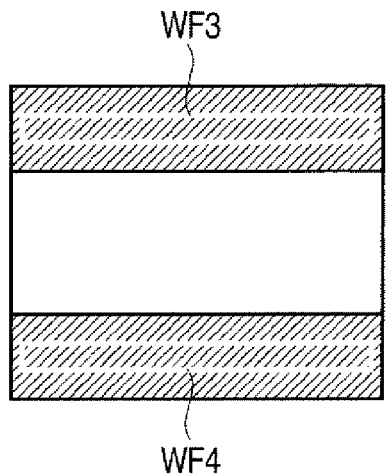
FIG. 3 is a diagram illustrating blank upper and lower strips contained in an image signal (for example, a letterbox image)

FIG. 3 is a diagram illustrating blank upper and lower strips contained in an image signal (such as a letterbox). When an uncropped widescreen film is displayed in an HD display area having an aspect ratio of 16:9, or in an SD display area having an aspect ratio of 4:3, black strips appear at the top and bottom of the screen. In spite of the fact that cross-color/dot interference has no effects on these blank upper and lower strips per se, the cross-color/dot interference may occur in a central letterbox display area. White frames WF3 and WF4 of the blank upper and lower strips, respectively, indicate detection widows for the blank upper and lower strips, respectively.

Figure 4:
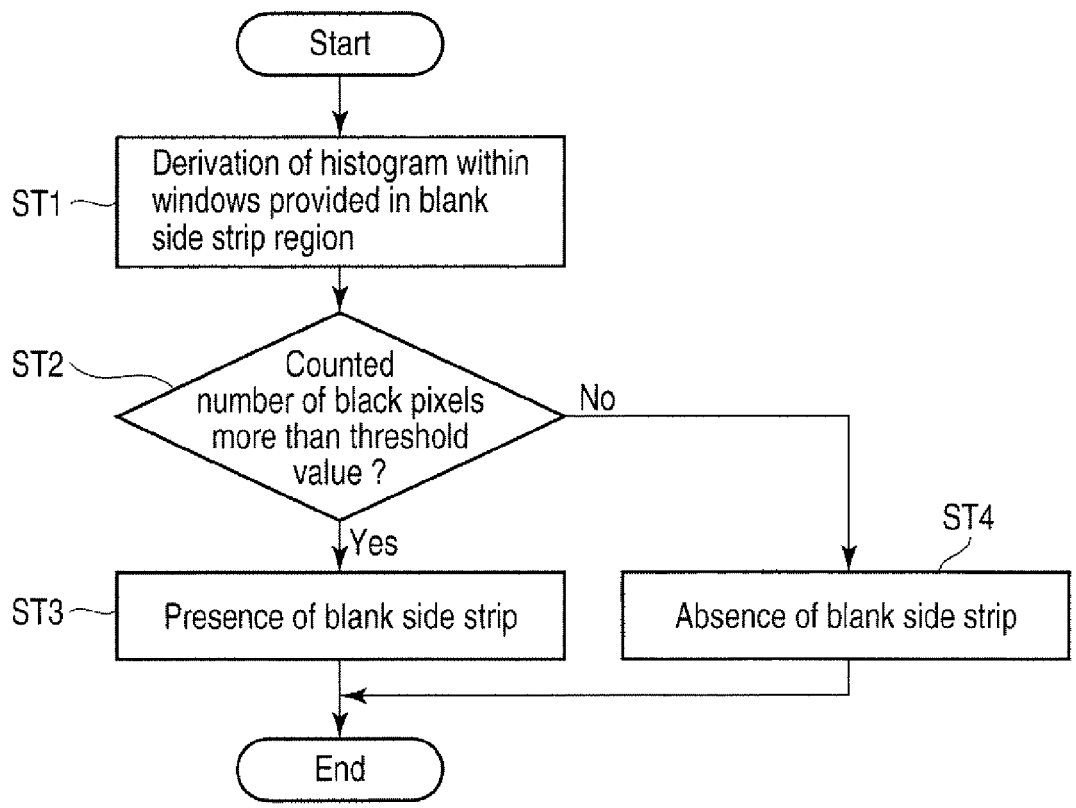
FIG. 4 is a flowchart illustrating a procedure for detecting a blank side strip.

FIG. 4 is a flowchart illustrating a procedure for detecting a blank side strip. This detection of the blank side strip is one of a plurality of functions which are provided by the image scene analysis unit 14.

When there is a possibility that blank side strips are contained in an image signal, detection windows (white frames WF1 and WF2 in FIG. 2) for the blank side strips are provided in a region of a screen on which the blank side strips are expected to exist and the number of black pixels (pixels having a luminance level less than or equal to a predetermined value) in the detection windows is counted to derive a histogram (ST1). When the number of the counted black pixels is more than a predetermined value (YES in ST2), it is determined that a blank side strip exists in a region where the detection window has been provided (ST3). Otherwise, when the number of the counted black pixels is less than or equal to the predetermined value (NO in ST2), it is determined that no blank side strip exists in the region where the detection window has been provided (ST4).

Depending on a determination result of presence of the blank side strip, a reduction effect of cross-color/dot interference will be controlled. For example, a cross-color/dot interference reduction circuit 100 may be operated or the reduction effect of the cross-color/dot interference may be decreased in case of the presence of the blank side strip. It is noted that, although not described in detail, blank upper and lower strips in FIG. 3 can be detected in a similar manner as the procedure illustrated in FIG. 4.

Figure 5:
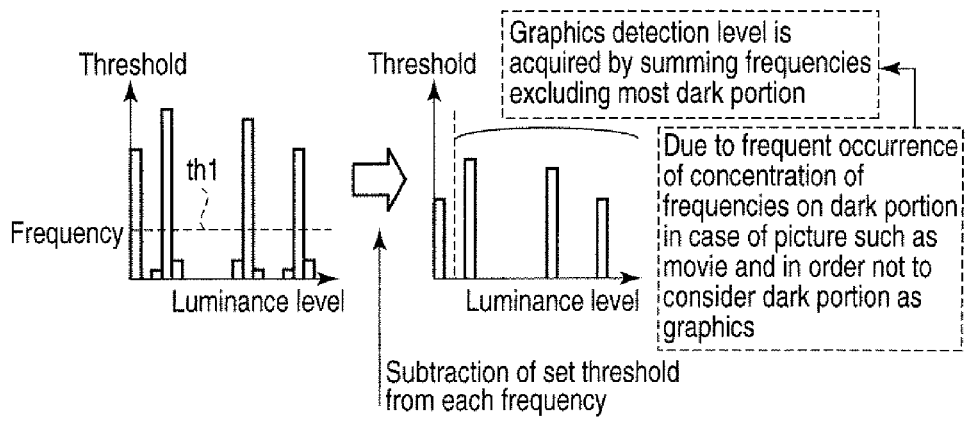
FIG. 5 is a diagram illustrating a histogram for a graphics image.

Detection of a graphics image will be described. This detection of the graphics image is also one of a plurality of functions which are provided by the image scene analysis unit 14. FIG. 5 is a diagram illustrating a histogram for a graphics image. Graphics (CG) electronically created by a computer or the like are different from natural objects in that the graphics are characterized by a frequency distribution of luminance levels concentrating on a particular luminance level. This is why, for detection of the graphics, for example, a portion of the histogram corresponding to a frequency greater than or equal to a predetermined frequency threshold th1 is extracted from the histogram and the reduction effect is controlled depending on a numerical value (graphics detection level) calculated by summing frequencies except for a frequency of the darkest portion. For example, the analysis result 15 provided from the image scene analysis unit 14 in FIG. 1 is modified such that the greater the graphics detection level, the more increased the effect of the cross-color/dot interference reduction circuit 100.

Figure 6A:
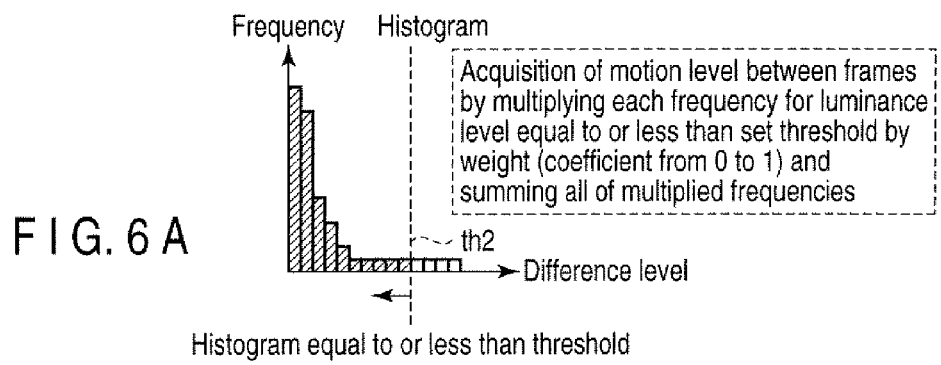
FIG. 6A is a diagram illustrating a histogram of differences in frames of an image.
Figure 6B:
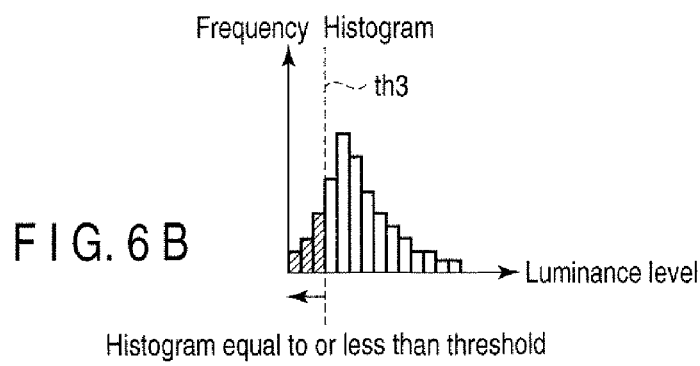
FIG. 6B is a diagram illustrating a histogram of low luminance levels.

FIGS. 6A and 6B are diagrams illustrating a histogram of differences in frames of an image and a histogram of low luminance levels, respectively. FIG. 6A illustrates a histogram of differences between a certain input frame signal (1) and a signal (3) preceding the input frame signal by one frame. This means that a portion of a difference histogram corresponding to a difference level less than or equal to a difference level threshold th2 is extracted from the difference histogram and a weighted version of each frequency, which is acquired by multiplying each frequency by a coefficient (a value from 0 to 1), is summed. A reduction effect is controlled based on a numerical value (motion level) derived from this sum. For example, the analysis result 15 provided from the image scene analysis unit 14 in FIG. 1 may vary such that, the greater the motion level, the more decreased the reduction effect of a cross-color/dot interference reduction circuit 100. This leads to a reduction of impression of blurring or a residual image.

The histogram in FIG. 6B is a luminance histogram for a certain input frame signal (1). In this histogram, a portion of the histogram corresponding to luminance levels less than or equal to a predetermined luminance threshold th3 is a histogram for lower luminance levels, and a dark image portion can be detected from this histogram for the lower luminance levels. When an image scene in the input frame signal mainly includes a lower luminance image portion (dark image portion), the perceived noise in an image of this frame can be reduced by increasing the effect of the cross-color/dot interference reduction circuit 100.

Figure 7:
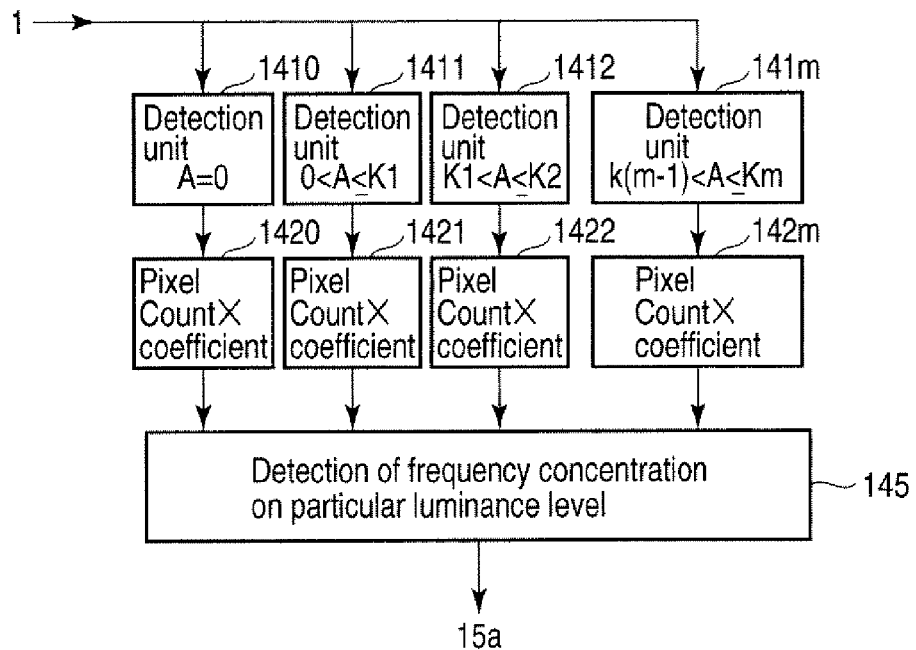
FIG. 7 is a diagram illustrating a first example of a structure of an image scene detection portion based on a histogram.

FIG. 7 is a diagram illustrating a first structure unit included in the image scene analysis unit 14. In this example, the image scene analysis unit 14 counts pixels present in one frame of a signal 1 (current input signal) for each amplitude level to derive a histogram of luminance levels. This means that, in the image scene analysis unit 14, a detection unit 1410 detects and counts pixels satisfying A=0, and outputs the count (number of pixels, i.e., frequency), where A represents a amplitude level of the signal 1. A detection unit 1411 counts pixels satisfying $0 < A \leq K1$, and outputs the count. A detection unit 1412 counts pixels satisfying $K1 < A \leq K2$, and outputs the count. In a similar manner, a detection unit 141$m$ counts pixels satisfying $K(m-1) < A \leq Km$, and outputs the count and so on. Each count acquired by each of the detection units 1410 to 141$m$ is appropriately weighted with a predetermined coefficient (a value from 0 to 1) in each of coefficient units 1420 to 142$m$. The results of counting thus weighted are input to a detection unit 145 of frequency concentration on a particular luminance level as histogram data.

The detection unit 145 of frequency concentration extracts frequencies greater than or equal to a threshold th1 in FIG. 5, for example, from the input histogram data. A sum of the extracted frequencies may correspond to a graphics detection level 15$a$. The image scene analysis unit 14 in FIG. 1 changes the analysis result 15 (increases a multiplication coefficient in a coefficient multiplier 16 or coefficient multiplier 8) to increase a reduction effect of the cross-color/dot interference reduction circuit 100 when the graphics detection level 15$a$ is higher.

Figure 8:
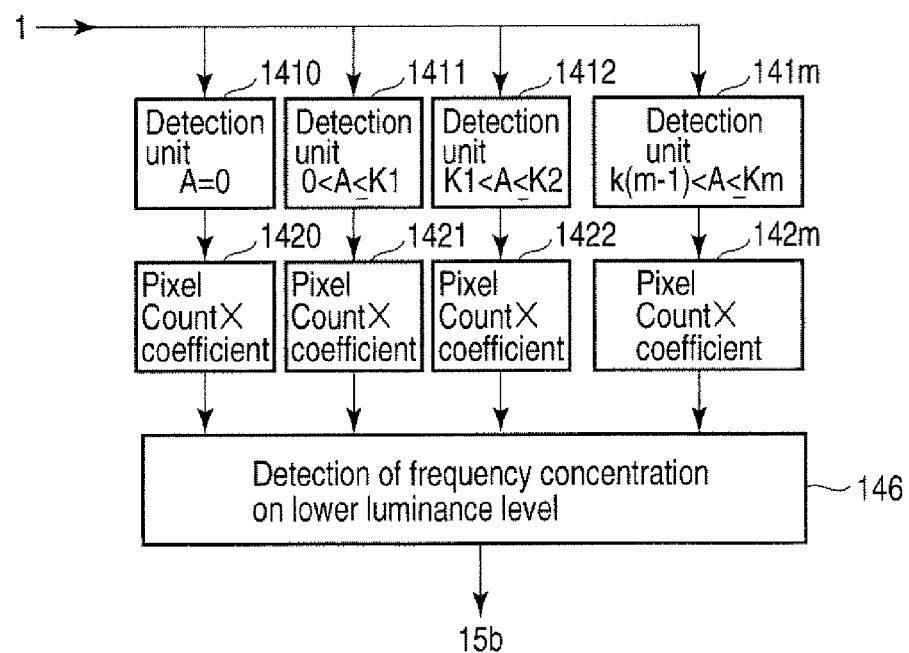
FIG. 8 is a diagram illustrating a second example of a structure of an image scene detection portion based on a histogram.

FIG. 8 is a diagram illustrating a second structure unit included in the image scene analysis unit 14. In this example, the image scene analysis unit 14 counts pixels present in one frame of the signal 1 for each amplitude level to derive a histogram of luminance levels. This is done in a similar way as in the case of FIG. 7. Results of counting, which have been detected in each of the detection units 1410 141$m$ and weighted in each of the coefficient units 1420 to 142$m$, are input as histogram data to a detection unit 146 of frequency concentration on a lower luminance level.

The detection unit 146 of the frequency concentration extracts count numbers (frequencies), which are less than or equal to a threshold th3, of a lower luminance portion of the histogram from the input histogram data (see FIG. 6B). The more the dark portions exist in an image frame from which the histogram has been derived, the larger the sum of the count numbers of the histogram detected in the detection unit 146. The less the dark portions exist, the smaller the sum of the count numbers of the histogram detected in the detection unit 146. That is to say, tendency of the histogram representing large/small amount of the dark portions can be detected by the detection unit 146 of the frequency concentration on the lower luminance level. A sum of the count numbers of the histogram detected in the detection unit 146 of the frequency concentration on the lower luminance level may correspond to a lower luminance detection level 15$b$. The image scene analysis unit 14 in FIG. 1 changes the analysis result 15 (increases a multiplication coefficient in the coefficient multiplier 16 or coefficient multiplier 8) to increase a reduction effect of the cross-color/dot interference reduction circuit 100 when the lower luminance detection level 15b is higher than a predetermined value.

As described above, based on the derived histogram, an image scene having a large dark area can be determined, and a cross-color/dot interference reduction effect can be controlled depending on a determination result. For example, since a lot of noise occurs in a scene having a large dark area, the noise can be reduced by increasing a cross-color/dot interference reduction effect.

Figure 9:
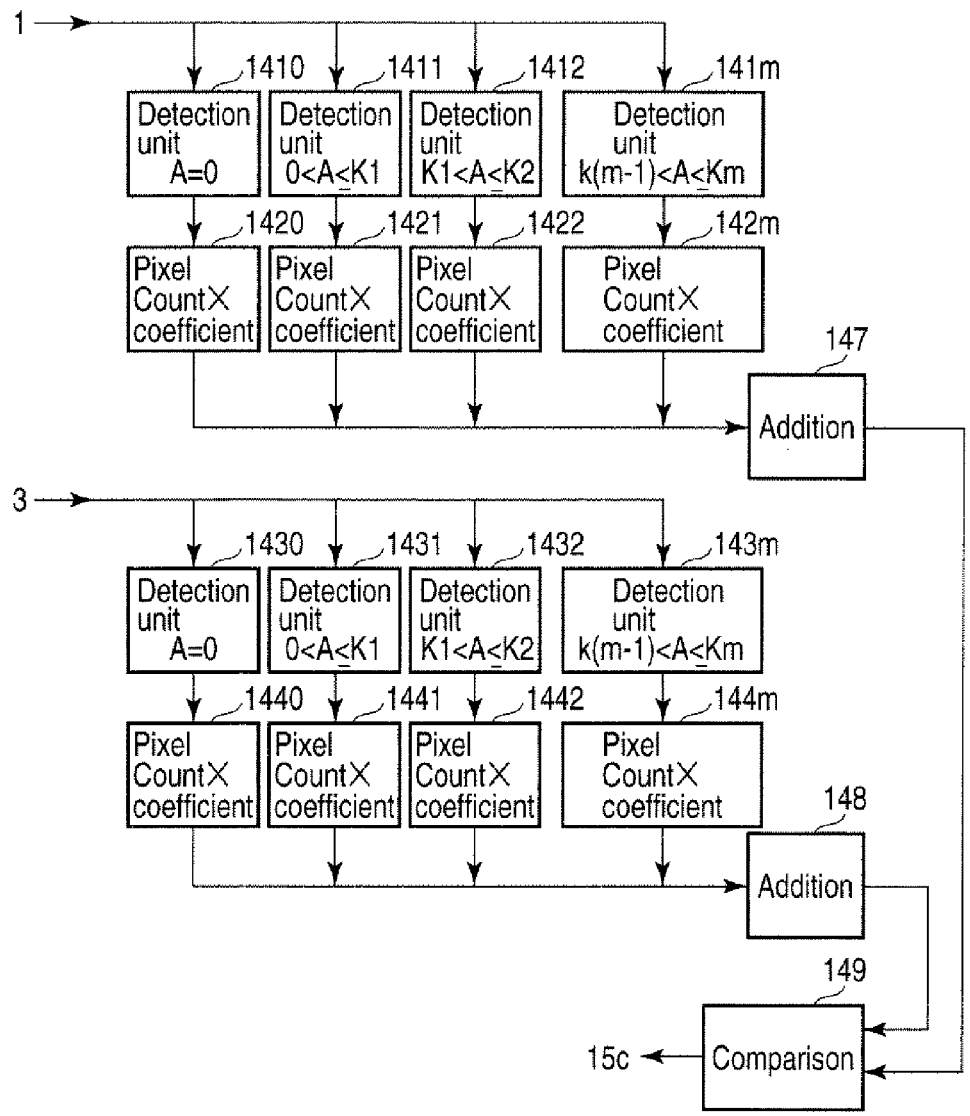
FIG. 9 is a diagram illustrating a third example of a structure of an image scene detection portion based on a histogram.

FIG. 9 is a diagram illustrating a third structure example included in an image scene detection unit using a histogram. In this example, the image scene analysis unit 14 counts pixels present in each frame of adjacent two frames for each amplitude level to derive a histogram of luminance levels. This is done in a similar way as in the case of FIG. 7.

This means that results of counting (frequencies), which have been detected by each of the detection units 1410 to 141m and weighted in each of the coefficient units 1420 to 142m, are input to an adder 147 as histogram data of the signal 1 (first frame). In addition, results of counting (frequencies), which have been detected by each of detection units 1430 to 143m and weighted in each of coefficient units 1440 to 144m, are input to an adder 148 as histogram data of a signal 3 (second frame).

An accumulated value acquired by adding frequencies of the histogram of the signal 1 (first frame) by the adder 147 and an accumulated value acquired by adding frequencies of the histogram of the signal 3 (second frame) by the adder 148 are input to a comparator 149. The comparator 149 determines that there is substantially no motion of an image scene between the first frame and the second frame when a difference between the two input accumulated values is less than a predetermined value. Furthermore, the comparator 149 determines that there is motion of an image scene between the first frame and the second frame when a difference between the two input accumulated values is more than the predetermined value.

A determination result from this comparator 149 may correspond to an analysis result 15c in terms of the motion of the image scene. The image scene analysis unit 14 in FIG. 1 changes the analysis result 15 (decreases a multiplication coefficient in the coefficient multiplier 16 or coefficient multiplier 8) to decrease a reduction effect of the cross-color/dot interference reduction circuit 100 when there is the motion of the image scene between the frames. This leads to a reduction of impression of blurring or a residual image in a scene with motion between the frames.

It is noted that the comparator 149 may provide not the above-mentioned determination result, but a difference between one addition result from the adder 147 and the other addition result from the adder 148 as a motion detection level 15c. In this case, the image scene analysis unit 14 decreases a value of the analysis result 15 and decreases the reduction effect of the cross-color/dot interference reduction circuit 100 when the motion detection level 15c is more than a predetermined threshold.

FIG. 10 is a diagram illustrating a fourth structure example included in an image scene analysis unit using a histogram. In this instance, the image scene analysis unit 14 serves as a histogram acquisition and frequency status determination unit. This means that the signal 1 input to the cross-color/dot interference reduction circuit 100 is input to n bandpass filters BPF1 to BPFn and one high-pass filter HPF. In this instance, HPF selectively passes a fine image signal component (especially high spatial frequency component). BPF1 selectively passes an image signal component which has a little variation (low spatial frequency component) within a frame. BPFn selectively passes an image signal component which has a variation greater (higher spatial frequency component) than that of BPF1 within a frame. BPF1 to BPF(n−1) selectively pass image signal components for a plurality of frequency bands. BPF1 to BPF(n−1) have passbands from low frequency to high in the order thereof. Use of BPF1 to BPFn and HPF makes it possible to derive a frequency information distribution (frequency histogram) within a frame of an input image.

This means that, in a certain digital image frame (for example, a frame corresponding to 1920×1080 pixels), occurrence frequency of pixels corresponding to signal components passing through BPF1 is equivalent to an accumulated number of pixels (corresponding to the above-mentioned count number or frequency) used to display similar luminance pictures having large areas. Occurrence frequency of pixels, which corresponds to signal components passing through BPFn, is equivalent to an accumulated number of pixels (corresponding to the above-mentioned count number or frequency) used to display similar luminance pictures having small areas in the order thereof. Occurrence frequency of pixels corresponding to signal components, which pass through HPF, is equivalent to an accumulated number of pixels (corresponding to the above-mentioned count number or frequency) used to display similar luminance pictures having very small areas. A frequency histogram can be achieved by accumulating and storing (counting up) outputs from BPF1 to BPFn and HPF, respectively. The accumulation and storage are performed in registers (otherwise accumulators or counters) 1041 to 104n and 104h.

The register 1041 stores a value calculated by multiplying the accumulated number of pixels (or pixel count number) corresponding to a passband of BPF1 by a predetermined weighting coefficient. The register 1042 stores a value calculated by multiplying the accumulated number of pixels (or pixel count number) corresponding to a passband of BPF2 by a predetermined weighting coefficient. In a similar manner, the register 104n stores a value calculated by multiplying the accumulated number of pixels (or pixel count number) corresponding to a passband of BPFn by a predetermined weighting coefficient, and so on. In addition, the register 104h stores a value calculated by multiplying the accumulated number of pixels (or pixel count number) corresponding to a passband of HPF by a predetermined weighting coefficient. It is noted that the weighting coefficient for each of the registers may be experimentally determined, on a case-by-case basis, depending on a content of an image (whether the image content is a commercial break image with blank side strips, CG image, actually captured image having a large motion, or the like).

The accumulated numbers of pixels (or pixel count numbers) stored in the registers 1041 to 104n are added up by an adder 104a and its addition result is input to a comparator 104c as low-band component data A. On the other hand, the accumulated number of pixels (or pixel count number) stored in the register 104h is input to the comparator 104c as high-band component data B. The comparator 104c determines whether the data B input from the register 104h is large or small based on the data A, which is input from the adder 104a (this large/small determination may be influenced by the degree of weighting in the registers 1041 to 104n and 104h). This determination result may be status determination data 15d indicating precision of an image scene. The analysis result 15d indicates a characteristic of a scene for the input image signal 1 (a proportion of high-band components relative to low-band components may vary depending on the scene). The status determination data 15d may be equivalent to a ratio of data B to data A (B/A), for example.

The image scene analysis unit 14 in FIG. 1 changes an analysis result (decreases a multiplication coefficient in the coefficient multiplier 16 or coefficient multiplier 8) and attempts to decrease a reduction effect of the cross-color/dot interference reduction circuit 100, when the status determination data 15d is more than a predetermined value, that is to say, when the input image signal 1 contains relatively many high-band components. This would prevent a scene of a very fine image having many high-band components (or a scene having much high-band information, such as a lattice pattern) from being blurred.

It is noted that a combination of BPF1 to BPFn and HPF with registers 1041-104n and 104h in FIG. 10 operates in a similar manner as that of detection the units 1410 to 141m with the coefficient units 1420 to 142m in FIG. 7, except for the fact that an object to be detected is a frequency histogram or a luminance histogram.

In the above-mentioned structures, an area of a plain region (a region having a low spatial frequency) in an input picture can be determined by deriving a histogram for each luminance level. Since the plain region in the picture refers to a portion having few level variations, a DC component appears in a frequency characteristic. Therefore, the DC component of the histogram can be ignored by multiplying the DC component by a coefficient of 0. However, when the area of the plain region is significantly large, in some cases, a desired effect cannot be obtained because a proportion of high-band components to be picked up will be reduced. Therefore, a correction coefficient depending on the area of the plain region of the picture may be created and paths to multiply the components by the correction coefficient (see blocks including "x coefficient" in FIGS. 7 to 10) are added to the structures.

FIG. 11 is a flowchart illustrating an example of a control operation in a cross-color/dot interference reduction circuit 100. When the digitized signal 1 is input to the cross-color/dot interference reduction circuit 100 of FIG. 1, an image scene contained in the signal is analyzed (ST10). For example, a luminance distribution or a frequency distribution of the image scene of the input signal is analyzed on a frame-by-frame basis. As a result, when it is detected that no blank side strips (see FIG. 2) are contained in the signal 1 (see FIG. 4) (NO in ST12), the cross-color/dot interference reduction circuit 100 disables its operation or decreases a cross-color/dot interference reduction effect (ST14). When the operation of the cross-color/dot interference reduction circuit 100 is disabled, the input signal 1 of FIG. 1 will be directly output as an output signal 11. When the cross-color/dot interference reduction effect is decreased, in the adder 10 of FIG. 1, a significantly small amount of an interference reduction signal 9 is added to the input signal 1. Therefore, an input image containing no blank side strips will be output from the cross-color/dot interference reduction circuit 100 without spoiling impression of fineness.

When it is detected that blank side strips are contained in the signal 1 (YES in ST12), the operation of the cross-color/dot interference reduction circuit 100 is enabled (ST16). Then, the luminance histogram or the frequency histogram can be derived from the input signal 1 and/or a delayed signal 3 delayed by one frame.

In a graphics image detection using a luminance histogram (ST20), when a value greater than or equal to a certain threshold is detected in the detection unit 145 of frequency concentration in FIG. 7 (YES in ST21), the cross-color/dot interference reduction effect is increased (the interference reduction signal 9 is amplified) (ST20). When a value greater than or equal to the threshold is not detected during the graphics image detection (NO in ST21), the cross-color/dot interference reduction effect is still maintained at an immediately previous level (the interference reduction signal 9 does not change) (ST34).

In a dark portion information (dark image portion) detection using a luminance histogram (ST22), when a value greater than or equal to a certain threshold is output from a detection unit 146 of frequency concentration in FIG. 8 (YES in ST23), the cross-color/dot interference reduction effect is increased (the interference reduction signal 9 is amplified) (ST30). When a value greater than or equal to the threshold is not detected during the dark portion information detection (NO in ST23), the cross-color/dot interference reduction effect is still maintained at an immediately previous level (the interference reduction signal 9 does not change) (ST34).

In a frame difference detection (detection of motion between frames) using a luminance histogram (ST24), when a value greater than or equal to a certain threshold is output from a comparison unit 149 in FIG. 9 (YES in ST25), the cross-color/dot interference reduction effect is decreased (the interference reduction signal 9 is attenuated) (ST32). When a value greater than or equal to the threshold is not detected during the frame difference detection (NO in ST25), the cross-color/dot interference reduction effect is still maintained at an immediately previous level (the interference reduction signal 9 does not change) (ST34).

In high-band information detection using a frequency histogram (ST26), when a value greater than or equal to a certain threshold is output from a comparison unit 104c in FIG. 10 (YES in ST27), the cross-color/dot interference reduction effect is decreased (the interference reduction signal 9 is attenuated) (ST32). When a value greater than or equal to the threshold is not detected during the high-band information detection (NO in ST27), the cross-color/dot interference reduction effect is still maintained at an immediately previous level (the interference reduction signal 9 does not change) (ST34).

In a process shown in FIG. 11, steps ST20 to ST27 may be executed in parallel. This is the reason why a multiplication coefficient 17 in FIG. 1 may be controlled such that, when the cross-color/dot interference reduction effect is increased to 50%, for example, due to a graphics image (YES in ST21) as well as the cross-color/dot interference reduction effect is decreased to 30%, for example, due to presence of motion in the image (YES in ST25), a resultant cross-color/dot interference reduction effect of +20% can be applied to the image in a frame. In this manner, the cross-color/dot interference reduction adapted to an image scene can be carefully performed frame by frame.

Otherwise, even in case of an image such as a letterbox image (or an image of an uncropped widescreen film), having a dark portion which occupies a rather large area in a whole frame (YES in ST23), when an image scene per se contains much high-band information, it is possible to prevent impression of sharpness of a very fine image from being spoiled by accordingly decreasing the cross-color/dot interference reduction effect in total (canceling a processing result of ST30 by a processing result of ST32).

It is noted that, in case of the letterbox image, the cross-color/dot interference reduction adapted to a scene of the letterbox image can be carefully performed frame by frame in a more precise manner by detecting blank upper and lower strips, as shown in FIG. 3, and excluding dark portion data of the blank upper and lower strips from materials to analyze an image scene.

In addition, there may be a difference in detection data of a histogram between presence and absence of the blank upper and lower strips, as illustrated in FIG. 3. Therefore, presence of the blank upper and lower strips is detected in advance, and control operations in a cross-color/dot interference reduction circuit (ST12 to ST34 in FIG. 11) may be performed separately between presence and absence of the blank upper and lower strips.

Advantageous Effect of Embodiments

In embodiments of the present invention, an image scene is analyzed frame by frame by various detection circuits using a histogram. This allows a cross-color/dot interference reduction effect to be increased for an image, such as a commercial break image having blank side strips, a graphics image, or an image having a large dark portion area, and the cross-color/dot interference reduction effect to be decreased for a scene in which defects such as impression of a residual image or impression of blurring occur in an image having a lot of motions or much high-band information. In this manner, a cross-color/dot interference reduction operation adapted to an image scene can be carefully performed frame by frame while preventing the defects such as the impression of residual image or the impression of blurring.

<Example of Relation Between Embodiments and Invention>

According to the present invention, cross-color interference caused by leakage of a luminance signal component into a chrominance signal and dot interference caused by leakage of a chrominance signal component into a luminance signal in a color television signal can be reduced. According to the present invention, a signal (5) is generated by applying an inverting addition to the input signals (1) from adjacent frames, a cross-color/dot interference component (7) is extracted from the signal (5) to which the inverting addition has been applied, and the input signal (1) is combined with an interference reduction signal (9) corresponding to the cross-color/dot interference component (7) to output an output signal (11) with a reduced cross-color/dot interference. In this method, an image scene contained in the input signal (1) is analyzed (ST10) and, based on the analysis result (15) of the image scene (ST12, ST20 to ST27), a reduction effect of the cross-color/dot interference is increased or decreased (ST30, ST32).

It is to be understood that the invention is not limited to the above-mentioned embodiments, but various changes and modifications may be made to the embodiments in embodying the invention without departing from the spirit and scope of the invention. Also the embodiments may be appropriately combined with each other wherever possible, and an advantageous effect may be obtained from each combination. Furthermore, since the above-mentioned embodiments may include various stages of the invention, various inventions can be conceived by appropriately combining a plurality of disclosed constituent elements. For example, even when some constituent elements may be deleted from all the constituent elements illustrated in the embodiments, a structure from which these constituent elements have been deleted may be construed as an invention, as long as the problem of the invention can be solved and the advantageous effect can be obtained.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A cross-color/dot interference reduction circuit which reduces cross-color interference caused by leakage of a luminance signal component into a chrominance signal and dot interference caused by leakage of a chrominance signal component into a luminance signal in a color television signal, comprising:
   a signal generation unit configured to calculate a difference in an input signal including the luminance signal or the chrominance signal between adjacent frames and generate a difference signal;
   a component extraction unit configured to extract a cross-color/dot interference component from the difference signal;
   a combination output unit configured to combine an interference reduction signal corresponding to the cross-color/dot interference component with the input signal and provide an output signal with a reduced cross-color/dot interference;
   an image scene analysis unit configured to analyze an image scene contained in the input signal; and
   a signal amplification/attenuation unit configured to amplify/attenuate the interference reduction signal based on an image scene analysis result from the image scene analysis unit,
   wherein the image scene analysis unit is configured to derive a histogram of pixels within one frame of the input signal, and the image scene is analyzed based on the derived histogram; and
   the output signal having an increased or decreased reduction effect of the cross-color/dot interference depending on a content of the image scene is output from the combination output unit.

2. The cross-color/dot interference reduction circuit of claim 1, wherein
   the image scene analysis unit is configured to derive a histogram of the input signal for each frame,
   either one of an operation to disable reduction of the cross-color/dot interference and an operation to decrease the reduction effect of the cross-color/dot interference is executed when it is detected that the input signal contains no blank side strip images from the derived histogram, and
   either one of an operation to increase or decrease the reduction effect of the cross-color/dot interference and an operation to maintain the reduction effect of the cross-color/dot interference at a particular effect level is executed depending on the content of the image scene when it is detected that the input signal contains a blank side strip image from the derived histogram.

3. The cross-color/dot interference reduction circuit of claim 1, wherein
   the image scene analysis unit is configured to derive a histogram of the input signal for each frame, and
   the reduction effect of the cross-color/dot interference is increased when it is detected that the input signal contains a graphics image component more than a predetermined frequency from the derived histogram.

4. The cross-color/dot interference reduction circuit of claim 1, wherein the image scene analysis unit is configured to derive a histogram of the input signal for each frame, and the reduction effect of the cross-color/dot interference is increased when it is detected that the input signal contains a dark portion image component more than a predetermined frequency from the derived histogram.

5. The cross-color/dot interference reduction circuit of claim 1, wherein the image scene analysis unit is configured to calculate a difference between the input signal and a delayed signal delayed by one frame and derive a difference histogram for each frame, and the reduction effect of the cross-color/dot interference is decreased when it is detected that the input signal contains a motion of an image more than a predetermined level from the derived difference histogram.

6. The cross-color/dot interference reduction circuit of claim 1, wherein the image scene analysis unit is configured to derive a histogram of the input signal for each frame, and the reduction effect of the cross-color/dot interference is decreased when it is detected that the input signal contains high-band image information more than a predetermined frequency from the derived histogram.

7. An image apparatus having a circuit which reduces cross-color interference caused by leakage of a luminance signal component into a chrominance signal and dot interference caused by leakage of a chrominance signal component into a luminance signal in a color television signal, comprising:

a signal generation unit configured to calculate a difference in an input signal between adjacent frames and generate a difference signal;

a component extraction unit configured to extract a cross-color/dot interference component from the difference signal;

a combination output unit configured to combine an interference reduction signal corresponding to the cross-color/dot interference component with the input signal and provide an output signal with a reduced cross-color/dot interference;

an image scene analysis unit configured to analyze an image scene contained in the input signal; and a signal amplification/attenuation unit configured to amplify/attenuate the interference reduction signal based on an image scene analysis result from the image scene analysis unit;

wherein the image scene analysis unit is configured to derive a histogram of pixels within one frame of the input signal, and the image scene is analyzed based on the derived histogram; and the output signal having an increased or decreased reduction effect of the cross-color/dot interference depending on a content of the image scene is output.

8. A method of reducing cross-color interference caused by leakage of a luminance signal component into a chrominance signal and dot interference caused by leakage of a chrominance signal component into a luminance signal in a color television signal, the method comprising:

calculating a difference in an input signal between adjacent frames and generating a difference signal;

extracting a cross-color/dot interference component from the difference signal;

combining by circuitry an interference reduction signal corresponding to the cross-color/dot interference component with the input signal and provide an output signal with a reduced cross-color/dot interference; and amplifying or attenuating by the circuitry the interference reduction signal based on an image scene analysis result;

wherein the method further comprises:

when analyzing an image scene contained in the input signal, deriving a histogram of pixels within one frame of the input signal, and analyzing the image scene based on the derived histogram; and providing an output signal having an increased or decreased reduction effect of the cross-color/dot interference based on an image scene analysis result.

* * * * *